May 10, 1960 — J. F. SUAREZ — 2,936,360
ELECTRIC HEATING PAD
Filed Sept. 15, 1958
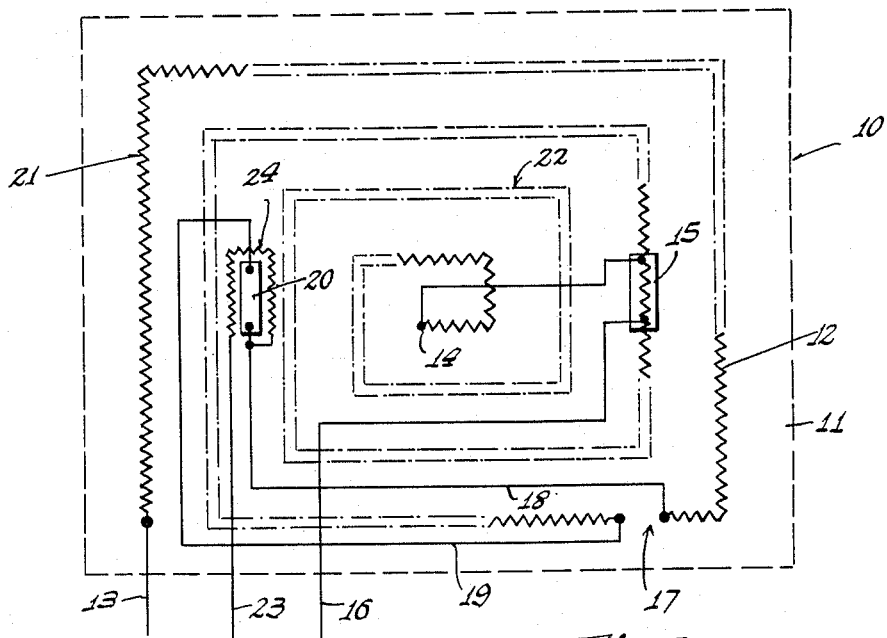
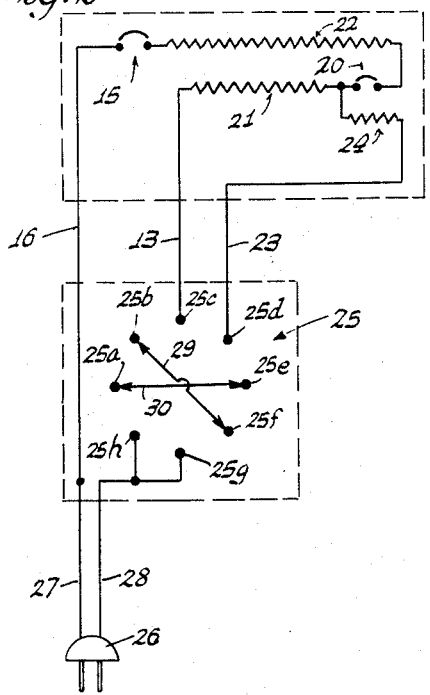
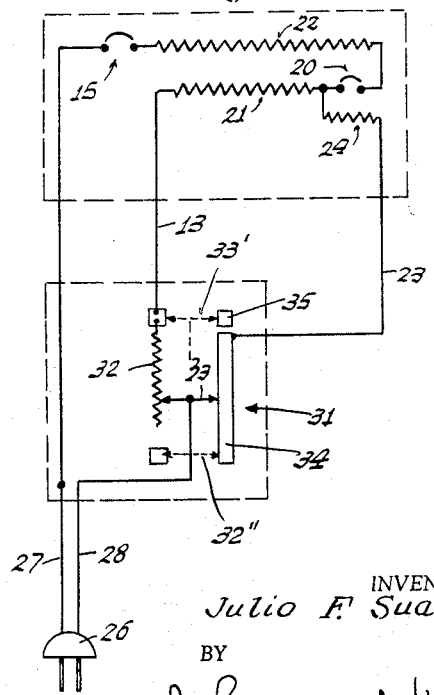
INVENTOR.
Julio F. Suarez
BY
Johnson and Kline
ATTORNEYS

United States Patent Office 2,936,360
Patented May 10, 1960

2,936,360

ELECTRIC HEATING PAD

Julio F. Suarez, Milford, Conn., assignor to Casco Products Corporation, Bridgeport, Conn., a corporation of Connecticut Application September 15, 1958, Serial No. 760,880

3 Claims. (Cl. 219—46)

The present invention relates to a heating pad energized by an electric current and more particularly to a pad having a plurality of different ranges of heat.

At present, proposed and constructed electric heating pads generally consist of a single coil of electric resistance wire and a thermostatic control switch positioned in heat conducting relation thereto for regulating the energization of the wire to maintain the temperature of the pad within a selected range. Since the thermostatic switch is only responsive to one temperature range of the heating pad, in order to provide a plurality of different temperature ranges called "heats," without requiring more than one thermostatic switch, it is necessary to synthesize the one condition on the thermostatic switch to which it is responsive. This is accomplished by the use of an electric heating element or heater, positioned closely adjacent the switch, to supply heat to the switch and this heat adds to the heat from the pad to create for the thermostatic switch, a synthesized pad temperature which causes the switch to function in its responsive range, it being understood that the more heat that the switch receives from the heater the less is required from the heating pad and hence a lower operating temperature of the heating pad may be maintained.

A manually operated heat selecting switch is connected to the heater and resistance wire and in order to regulate the heat emitted from the heater, it includes a variable resistance or a rheostat that controls the amount of electric current to the heater and hence the operating heat of the pad. While this structure of heating pad and selecting switch has been found satisfactory, it will be appreciated that a relatively large rheostat is needed in the selecting switch in order to effectuate a plurality of heats, that the heat developed in the rheostat must be dissipated and this difficulty is increased by the selecting switch being required to be maintained at a comfortable handling temperature and also that there is a decrease in the efficiency of the heating pad in converting the electrical energy into usable heat from the pad.

An object of the present invention is to provide in an electric heating pad having a heating coil, a thermostatic switch and a switch heater for an increase in the efficiency in the pad in converting the electrical energy to usable heat in the pad.

Another object of the present invention is to provide in a heating pad of the above type for a reduction in the size of the rheostat required in the selecting switch and hence reduce the heat required to be dissipated therein.

A further object of the present invention is to provide a heating pad as above disclosed which is economical to manufacture, reliable in use and operable for extended usage and may be used with selecting switches that do not have resistances in the selecting switch.

In carrying out the present invention, there is provided in the heating pad of the present invention, a resistance wire divided into a main heating coil and an auxiliary heating wire, a thermostatic switch having a heater and a manual selecting switch for setting the desired heat of the heating pad. In order to obtain the above objects the auxiliary heating coil is electrically interconnected with the variable resistance of the selecting switch and the heater for the thermostatic switch, to provide a parallel path for current through the selecting switch at other than the highest and lowest heats of the pad. A portion of the resistance and auxiliary coil constitutes one path and the heater constitutes the other path and accordingly as the resistance of the first path varies it alters the current flow through the heater in the second path. In this manner the auxiliary heating coil electrically functions as if it is part of the resistance in the selecting switch and yet since it is positioned in the heating pad any heat developed thereby is beneficial and reduces the amount of heat which occurs in the switch.

While the pad has particular utility when combined with a switch containing a resistance, the pad of the present invention also may be used with selecting switches which do not contain resistances. Thus for example in one of the embodiments disclosed, a three heat switch (no resistance) is employed with the pad. Accordingly one pad may thus be utilized with either type of switch.

Other features and advantages will hereinafter appear.

In the drawing:

Figure 1 is a view of the heating pad structure showing relative positions of the heating wires and the thermostatic switches with the electrical components shown.

Fig. 2 is an electrical schematic diagram of the heating pad and a selecting switch having no resistance incorporated therein for providing only three different degrees of heat of the pad.

Fig. 3 is a schematic diagram similar to Fig. 2 showing the heating pad of the present invention and a selecting switch having a variable resistance which enables more than three different heats of the heating pad to be attained.

Referring to the drawing, Figure 1, the heating pad is generally indicated by the reference numeral 10 and consists of a fabic (or other flexible material) base member 11 on which is stitched or otherwise secured a length of electrical resistance wire 12. The wire 12, since the pad is rectangular, is preferably wound in a spiral having substantially rectangular loops to provide heat evenly about the pad. One end 13 of the wire 12 extends directly outwardly from the pad and the other end 14 which is located at the end of the inner coil is electrically connected to a safety thermostat 15 which in turn has a lead 16 extending from the pad. The wire 12 is broken at 17 and interconnected in series therewith by the leads 18 and 19 is a control thermostat 20.

It will be appreciated that the break at 17 divides the heating wire into two coils, an auxiliary heating coil 21 which terminates at the end 13 and a main heating coil 22 which terminates at the end 14. A wire 23 which is connected to one end of a heater 24 (shown schematically) for the control thermostat 20 extends out of the pad.

The safety thermostat 15 is positioned to be closely adjacent and may even be in touching engagement with a length of the main heating coil 22, while the control thermostat is positioned between two adjacent lengths spaced somewhat from each for a reason which will be hereinafter apparent. The safety thermostat is set to open the circuit at a higher heating pad temperature than the control thermostat and thus only serves to prevent overheating of the heating pad while the control thermostat functions to control the energization of the heating pad to maintain it within the range of the selected heat.

While not shown, it is preferred to encase the above elements in a waterproof insulating bag to protect them from moisture and to prevent any malfunctioning from being injurious to a user.

In the schematic diagram shown in Fig. 2 wherein like elements above mentioned have been given the same reference numerals, the pad is shown connected to a three position selection switch 25 which does not have a resistance incorporated therein. A conventional household electrical plug 26 has a pair of leads 27 and 28, the lead 27 connecting through the switch to lead 16 of the pad. The switch 25, as schematically shown, provides for three degrees of heat, namely high, medium and low, of the heating pad and an off position. To this end the switch has eight circularly spaced contacts indicated clockwise by reference characters 25a through 25h, and a pair of rotatively mounted contact arms 29 and 30 connected together and engageable with the contacts. The lead 28 is electrically connected to the contacts 25g and 25h and the end 13 is connected to the contact 25c while the lead 23 is connected to the contact 25d. In the position shown, the switch 25 is at its "off" position and there is no energization of the heating pad. Rotation of the arms 29 and 30 ⅛ of a turn clockwise results in the switch 25 being in the position for effecting the highest heat from the pad and to this end current is conducted from the contact 25g through arm 29 to the contact 25c and hence through the lead 13 through both the auxiliary coil and the main coil. There is no current flowing through the heater for this position of the switch and hence operation of the thermostatic switch is solely dependent upon the heat it receives from the heating pad wires.

Further rotation of the arms clockwise ⅛ of a turn connects contacts 25g and 25c through the arms 30 and contacts 25h and 25d through the arm 29. This provides current to both the auxiliary heating coil and through the heater 24 for the switch 20 by placing both of them in parallel with the line 28. Continued rotation of the contact arms ⅛ of a turn will connect the switch arm 30 to the contacts 25h and 25d thereby energizing only the heater switch and main heating coil. This provides more energization of the heater and hence a lower temperature of the heading pad is required to operate the thermostatic switch.

It will thus be appreciated that with a three position switch at high position no current flows through the heater for the switch. At low position the heater is fully energized and at intermediate position the heater is only partially energized by reason of it being connected in parallel to the auxiliary coil.

As shown in the schematic diagram in Fig. 3 wherein the heating pad, plug and lines 27 and 28 are the same as in the previously described embodiment of the invention, however in this embodiment there is a switch 31 providing for the selection of one of numerous values of heats of the pad. To this end the switch 31 includes a resistance 32, a movable contact 33 connected to the lead 28 and a conducting strip 34. This strip is connected to the lead 23 and hence the heater while one end of the resistance 32 is connected to the lead 13. When the movable contact is at the dotted line position 33' current goes directly to the auxiliary heating coil and none through either the heater or the resistance since the movable contact engages an insulating block 35 and the end of the lead 13 at the other side. This is the highest heat position of the switch. When the movable contact 33 is in the dotted line position 32" all current goes through the strip 34 to the heater and the main heating coil and provides the lowest heat of the heating pad.

At any intermediate position of the movable contact 33 wherein it is in conducting relation to both the resistance 32 and the contact strip 34, the current through the lead 28 divides into two paths, one being the heater and the other the auxiliary heating coil and resistance 32 with the amount of current through each path being based on the relative inverse values of the heater resistance and the sum of the resistance of the auxiliary coil and the portion of the resistance 32 in the circuit. Thus as the resistance ratio between these two paths varies, i.e. a smaller portion of the resistance 32 in the circuit, a smaller amount of current will flow through the heater and hence a higher heat of the heating pad will result. The converse is true since if more of the resistance 32 is in the circuit a lower heat of the heating pad is caused.

It will be appreciated that the auxiliary heating coil is in effect part of the resistance 32 and yet since it is positioned within the heating pad the size of the resistance 32 may be reduced by this amount of resistance and thus less heat is produced in the selecting switch 31 resulting in a more efficient heating pad.

While in Fig. 2 there has been shown a switch not having a resistance it will be appreciated that the same heating pad may be used with either a fixed number of heats such as switch 25 or numerous values of fixed heats which are produced by the switch 30. Thus a single heating pad of the present invention can be utilized with either type of switch with no changes in its construction.

It will accordingly be appreciated that there has been disclosed a heating pad which is usable with either a switch containing a variable resistance or a switch having a fixed number of heats. The pad when used with the first mentioned switch enables a reduction in the size in the resistance of the switch in a simple and efficient manner and thus enables a greater utilization of electric current for providing usable heat in the pad. In addition the pad when used with a switch of the latter type obviates having resistances in the switch with the attendant advantages obtained thereby.

Though the term heating pad has been utilized throughout, it is to be understood that the invention is not to be limited solely to small pads but includes larger heating pads, generally referred to as blankets.

Variations and modifications may be made within the scope of the claims and portions of the improvements may be used without others.

I claim:

1. An electric heating pad comprising a base member, a length of electrical resistance wire forming a main heating element, a second length of electrical resistance wire forming an auxiliary heating element, means securing both elements to the base member, a thermostatic switch having a heater, means connecting the auxiliary heating element and the heater in parallel to each other and in series with the main heating element and thermostatic switch, three leads extending from the base member, one being connected to one end of the main heating element, a second being connected to one end of the auxiliary heating element and the third being connected to one end of the heater, and a selecting switch connected to the leads for selectively energizing either the auxiliary heating element or the heater separately or simultaneously, said switch including a variable resistance having a movable tap, a conducting member and a pair of input wires, means connecting one input wire with the one lead, means connecting the other input wire to the tap, means connecting the second lead to an end of the resistance and means connecting the third lead to the conducting member, said tap being engageable throughout its intermediate positions on said resistance with said conducting member, whereby said tap engages both the resistance and the conducting member at its intermediate positions to eletrically connect the auxiliary heating coil and the heater in parallel.

2. An electric heating pad comprising a base member, a length of electrical resistance wire forming a main heating element, a second length of electrical resistance wire forming an auxiliary heating element, means securing both elements to the base member, a thermostatic switch having a heater, means connecting the auxiliary heating element and the heater in parallel to each other and in series with the main heating element and thermostatic switch, and three leads extending from the base member, one being connected to one end of the main heating element, a second being connected to one end of the auxiliary heating element and the third being connected to one end of the heater, and a manually operable switch including an adjustable resistance connected to the second lead and means in said switch when both the auxiliary heating element and the heater are energized for connecting the adjusted portion of the resistance in series with the second lead thereby enabling adjustment of the amount of current through the heater to control the temperature of the pad.

3. An electric heating pad comprising a base member, a length of electrical resistance wire forming a main heating element, a second length of electrical resistance wire forming an auxiliary heating element, means securing both elements to the base member, a thermostatic switch having a heater, means connecting the auxiliary heating element and the heater in parallel to each other and in series with the main heating element and thermostatic switch, three leads extending from the base member, one being connected to one end of the main heating element, a second being connected to one end of the auxiliary heating element and the third being connected to one end of the heater, and a selecting switch connected to the leads for selectively energizing either the auxiliary heating element or the heater separately or both together, said switch further including an adjustable resistance and means when both the auxiliary heating element and the heater are energized for connecting the adjusted portion of the resistance in series with either the second or third leads thereby enabling adjustment of the amount of current through the heater to control the temperature of the pad.

References Cited in the file of this patent

UNITED STATES PATENTS

| | | |
|---|---|---|
| 2,237,852 | Taylor | Apr. 8, 1941 |
| 2,246,238 | Bradford | June 17, 1941 |
| 2,421,953 | MacKendrick | June 10, 1947 |
| 2,425,686 | Porter | Aug. 12, 1947 |
| 2,441,005 | Bradford | May 4, 1948 |
| 2,452,622 | Youhouse | Nov. 2, 1948 |
| 2,705,276 | Wise | Mar. 29, 1955 |